(12) United States Patent
Juras et al.

(10) Patent No.: US 7,941,369 B2
(45) Date of Patent: May 10, 2011

(54) METHOD OF ASSISTING A BUSINESS IN ACQUIRING MERCHANT SERVICES

(76) Inventors: Joseph James Juras, Mooresvillle, NC (US); Rosetta Laverne Jones, Mooresville, NC (US)

( * ) Notice: Subject to any disclaimer, the term of this patent is extended or adjusted under 35 U.S.C. 154(b) by 475 days.

(21) Appl. No.: 11/552,561

(22) Filed: Oct. 25, 2006

(65) Prior Publication Data
US 2008/0120194 A1 May 22, 2008

(51) Int. Cl.
*G06Q 40/00* (2006.01)
(52) U.S. Cl. ............... 705/39; 705/41; 705/65; 705/17; 235/379; 235/380; 235/381
(58) Field of Classification Search ............... 705/39, 705/41, 65, 17; 235/379–381
See application file for complete search history.

(56) References Cited

U.S. PATENT DOCUMENTS

| | | | |
|---|---|---|---|
| 5,255,182 A | 10/1993 | Adams | |
| 5,852,812 A * | 12/1998 | Reeder | 705/39 |
| 7,043,451 B2 * | 5/2006 | Strayer et al. | 705/39 |
| 7,069,244 B2 | 6/2006 | Strayer et al. | |
| 2003/0061157 A1 | 3/2003 | Hirka et al. | |
| 2004/0054625 A1 | 3/2004 | Kellogg et al. | |
| 2004/0236682 A1 | 11/2004 | Strayer et al. | |
| 2005/0178824 A1 | 8/2005 | Benson et al. | |
| 2006/0026073 A1 | 2/2006 | Kenny, Jr. et al. | |

OTHER PUBLICATIONS

Philip Babcock Gove, Editor in Chief, Webster's Third New International Dictionary, Merriam-Webster, Incorporated (Springfield, Massachusetts), (p. 18), (1993).
Wikipedia, "http://en.wikipedia.org/wiki/Merchant_services", Apr. 14, 2008.
Wikipedia, "http://en.wikipedia.org/wiki/Computer_network", Sep. 23, 2010.

* cited by examiner

*Primary Examiner* — Daniel S Felten
(74) *Attorney, Agent, or Firm* — Hammer & Associates, P.C.

(57) ABSTRACT

A method of assisting a business in acquiring merchant services includes the following steps: gathering the information of the business; comparing the gathered information to a repopulated rate grid from merchant acquirers; and providing the business with at least one competitive acquirer rate.

19 Claims, 2 Drawing Sheets

US 7,941,369 B2

METHOD OF ASSISTING A BUSINESS IN ACQUIRING MERCHANT SERVICES

FIELD OF INVENTION

The instant application relates to a method of assisting a business in acquiring merchant services.

BACKGROUND OF THE INVENTION

'Merchant services' is the name given to a category of financial services intended for use by businesses. More specifically, 'merchant services' refers to the service that enables a business to accept an electronic payment by use of the customer's credit card, debit card, prepaid card, gift card, or electronic check.

Many businesses are accepting electronic payments by way of the customer's credit card, debit card, prepaid card, gift card, or electronic check. By accepting multiple forms of payment, businesses give their customers payment options that improve their buying power. In addition, merchant services with electronic payment processing can be a solution that is efficient and convenient to the business. Merchant services can help a business improve cash flow by ensuring timely automatic deposits to their account and increasing the average sale. While merchant services offer many benefits to the business, it also comes at an expense.

A merchant acquirer is a company offering debit card, credit card and electronic check acceptance services for merchants, or businesses. Often a merchant acquirer is partially or wholly owned by a bank, meaning, sometimes a bank itself offers acquiring services. Merchant acquirers charge the merchants a number of fees which may include: a set up fee for each merchant account, a monthly rent for the Point Of Sale (POS) terminal (if it is not owned by the merchant) which is usually equivalent to approximately (30) thirty to fifty (50) dollars per month, a percentage fee on each transaction, a transaction fee for each transaction, a per item authorization fee for each transaction, a monthly maintenance fee for each account, and a monthly minimum discount fee.

Each of these fees varies from one merchant acquirer to the next and from one transaction to the next. As examples, the percentage fee is often much lower for debit card transactions than for credit card transactions. Sometimes there is an additional fixed fee per transaction, which may range from ten (10) to twenty (20) cents. Many merchant acquirers assess a specific monthly maintenance fee. Furthermore, a business may be assessed a mid-qualified or a non-qualified fee for each transaction. The costs of these services vary greatly based on a host of factors from who offers the service, the type of business needing the service, how the card is accepted, what equipment is used, what information is imputed during the card transaction, when the transaction is settled, and what specific credit or debit card is used.

With the numerous fees and various pricing schemes, businesses are easily confused about the prices involved with regard to acquiring merchant services. Different merchant acquirers often provide pricing proposals that are vague and inconsistent, creating confusion when a merchant is shopping around for the lowest price for merchant services. Also, because merchant services may be provided by either a bank, an Independent Sales Organization (ISO) or a third party credit card processor, businesses are confused about who offers the merchant services.

As a result of the confusion regarding merchant services, businesses do not know where to shop around for the lowest price when acquiring merchant services. Businesses not only do not have the knowledge, but they also do not have the time to obtain information from every merchant acquirer that is offering merchant services. Accordingly, with the existing number of businesses today that need or will need merchant services, the competitive nature of offering services today is not being met easily or efficiently.

Thus, there is a need for a method of assisting businesses in acquiring merchant services.

The instant invention is designed to address these problems.

SUMMARY OF THE INVENTION

The instant invention is a method of assisting a business in acquiring merchant services. The method includes the following steps: gathering the information of the business; comparing the gathered information to a repopulated rate grid from merchant acquirers; and providing the business with at least one competitive merchant rate.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
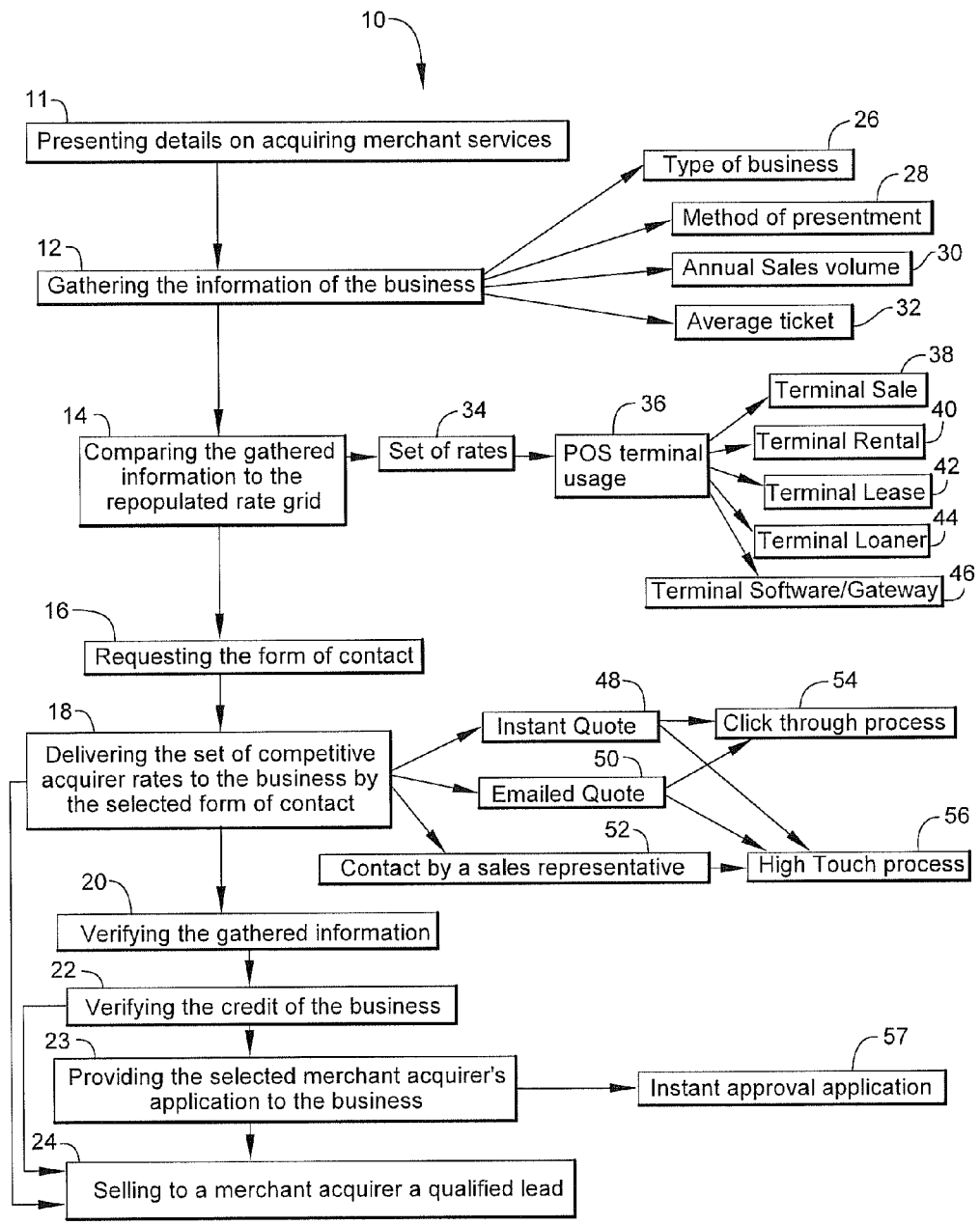
FIG. 1 is a flow chart of one embodiment of the method of assisting a business in acquiring merchant services.

Referring to the drawings, wherein like numerals indicate like elements, there is shown in FIG. 1 an embodiment of a method 10 of assisting a business in acquiring merchant services. Method 10 may be for assisting businesses in acquiring merchant services by providing information regarding merchant services, including, but not limited to, the details of acquiring merchant services, and at least one competitive acquirer rate. Method 10 may be carried out over a computer network 70 (see FIG. 2). Method 10 may include any steps that assist the business in acquiring merchant services, including, but not limited to, the following steps illustrated in FIG. 1: a step 11 of presenting details on acquiring merchant services; a step 12 of gathering the information of the business; a step 14 of comparing the gathered information to a repopulated rate grid; a step 16 of requesting a form of contact for the competitive acquirer rates to be delivered to the business; a step 18 of delivering the competitive acquirer rates to the business by the selected form of contact; a step 20 of verifying the gathered information; a step 22 of verifying the credit of the business; a step 23 of providing the selected merchant acquirer's application to the business; and a step 24 of selling to a merchant acquirer a qualified lead.

Step 11 of presenting details on acquiring merchant services may be included in method 10 (see FIG. 1). Step 11 may be for presenting the business with the details on acquiring merchant services and may include any step for presenting the details. Step 11 may be accomplished by any method, including, but not limited to, an informational page 74 (see FIG. 2), a brochure, a presentation, etc. Step 11 may present any details related to acquiring merchant services, including, but not limited to, who the merchant acquirers are, interchange, MasterCard® and Visa® dues and assessments, the average merchant rates, the factors that are used to calculate the merchant rates, point of sale terminal options, pricing, usage, merchant service contract information, billing information, and information on various types of credit/debit cards that are accepted and their associated rates.

Step 12 of gathering the information of the business may be included in method 10 (see FIG. 1). Step 12 may be for gathering the information of the business and may include any step for gathering the information of the business. Step 12 may be gathering any information from the business, including, but not limited to, a type of business 26, a method of presentment 28, an annual sales volume 30, and an average ticket 32. Step 12 may also include gathering the personal information of the business owner, including, but not limited to, the owner's name, the home and business addresses, the home and business phone numbers etc.

Type of business 26 may be gathered in step 12 of method 10 (see FIG. 1). Type of business 26 may be for determining what type of business is using method 10 for assistance in acquiring merchant services. Type of business 26 may be any type of business. Type of business 26 may be broadly categorized into any categories, including, but not limited to, retail, restaurant, retail service with tips, professional, internet/ecommerce, lodging, trade services, government, and mail/phone order.

Method of presentment 28 may be gathered in step 12 of method 10 (see FIG. 1). Method of presentment 28 may be for determining what method the customers will present their credit/debit card to the business. Method of presentment 28 may be any method of presentment, including, but not limited to, card present or card not present. The card present method may be used where the consumer will be physically presenting their debit/credit card to the business. The card not present method may be used where the consumer will not be physically presenting their debit/credit card to the business. Examples for businesses with the card not present method include, businesses related to catalog orders, mail orders, internet orders, and businesses processing credit or debit card transactions via a computer, credit card terminal, or telephone while using a keypad.

Annual sales volume 30 may be gathered in step 12 of method 10. Annual sales volume 30 may be for determining the annual credit or debit card volume of sales for the business (see FIG. 1). Annual sales volume 30 may be the annual volume of sales from the previous year for an established business or may be an anticipated annual volume of sales for a new or start-up business.

Average ticket 32 may be gathered in step 12 of method 10 (see FIG. 1). Average ticket 32 may be for determining the average ticket, or average total credit or debit card sale per customer for the business. Average ticket 32 may be the average total sale per credit or debit card transaction. As an example, if a business has ten debit or credit card transactions for a total of one hundred dollars ($100.00), average ticket 32 may be ten dollars ($10.00). Average ticket 32 may be the average ticket from the previous year for an established business or may be an anticipated average ticket for a new or start-up business.

Step 14 of comparing the gathered information to a repopulated rate grid may be included in method 10 (see FIG. 1). Step 14 may be for comparing the gathered information to the repopulated rate grid in order to calculate at least one competitive acquirer rate and may include any step for comparing the gathered information to the repopulated rate grid. Step 14 may include using an electronic spreadsheet for comparing the gathered information to the repopulated rate grid.

The repopulated rate grid may include a set of rates 34 (see FIG. 1). The repopulated rate grid may include rates 34 for at least two merchant acquirers. In one embodiment, the repopulated rate grid may include rates 34 from all possible merchant acquirers that offer merchant services to the business using method 10. Set of rates 34 allows method 10 to compare the gathered information from the business to each rate 34 given by each merchant acquirer to provide the business with at least one competitive acquirer rate. Set of rates 34 from each merchant acquirer should include a rate for each possible combination of gathered information, specifically, each combination of type of business 26, method of presentment 28, volume 30, and average ticket 32.

Set of rates 34 may also be given for all POS terminal usage 36 (see FIG. 1). POS terminal usage 36 may be the way the business will use the POS terminal equipment of the merchant acquirer. POS terminal usage 36 may include, but is not limited to, a terminal sale 38, a terminal rental 40, a terminal lease 42, a terminal loaner 44, or a terminal software/gateway 46. Software/gateway 46 may be a payment processing software or a secure payment processing gateway where a computer may be used for processing credit and debit card transactions. The merchant acquirer may either provide a different rate for each POS terminal usage 36 or may give the same rate for each POS terminal usage 36. Other factors may be included for set of rates 34, including, but not limited to, the functionality of the POS terminal (using a dial up or broadband connection) or whether a peripheral such as a pin pad may be purchased, leased, or rented to process (online) pin based debit transactions.

Step 16 of requesting a form of contact for the competitive acquirer rates to be delivered to the business may be included in method 10 (see FIG. 1). Step 16 may be for obtaining a form of contact for the competitive acquirer rates to be delivered to the business and may include any step for obtaining the form of contact. The form of contact may include any form of contact, including, but not limited to, an instant quote 48, an emailed quote 50, or contact by a sales representative 52.

The at least one competitive acquirer rate may be the best rate or rates provided by all of the merchant acquirers based on the gathered information of the business and set of rates 34. The competitive acquirer rate may be given in the form of a detailed pricing plan. The detailed pricing plan may be presented in a simple easy to read form that may be understandable to the average business owner.

Step 18 of delivering at least one competitive acquirer rate to the business by the selected form of contact may be included in method 10 (see FIG. 1). Step 18 may be for delivering the at least one competitive acquirer rate to the business by the selected form of contact and may include any steps for delivering the competitive acquirer rates to the business by the selected form of contact. For example, if the form of contact selected by the business may be instant quote 48, step 18 may be delivering the competitive acquirer rates instantly or through a click through process 54. Click through process 54 may be providing a link to the selected merchant acquirer's web page that can be tracked for the amount of times accessed. As another example, if the form of contact selected may be emailed quote 50, step 18 may be delivering the competitive acquirer rates via email to the business. As another example, if the form of contact selected may be contact by a sales representative 52, step 18 may be delivering the competitive acquirer rates by a high touch process 56. High touch process 56 may be where a sales representative calls the business and the sales representative keeps track of the number of calls made.

Step 20 of verifying the gathered information may be included in method 10 (see FIG. 1). Step 20 may be for verifying the gathered information of the business and may include any steps for verifying the gathered information from the business. In one embodiment, step 20 may be verifying the information gathered from the business by a personal credit check through a credit reporting agency. In addition, this information gathered may also be compared to the "MATCH" File ("Member Alert to Control High-Risk Merchants" File) used by MasterCard®. Step 20 may also be achieved through a telephone call to the business seeking merchant services.

Step 22 of verifying the credit of the business may be included in method 10 (see FIG. 1). Step 22 may be for verifying the credit of the business. Step 22 may include any steps for verifying the credit of the business, including, but not limited to, obtaining the business' credit score from one or more credit agencies.

Step 23 of providing the selected merchant acquirer's application for the business to complete may be included in method 10 (see FIG. 1). Step 25 may be for allowing a merchant to complete and submit a selected merchant acquirer's application after at least one acquirer rate has been provided and accepted. Step 25 may include the business providing any additional information when filling out the application, including, but not limited to, the owner's social security number, date of birth, drivers license number, bank account number, routing number, the type of corporation, the federal tax identification number, etc. Step 25 may allow a merchant to complete any type of application, including, but not limited to an electronic application. The electronic application may be an online application that may result in an approved merchant account or an instant approval. The online application may allow the business to complete and submit the online merchant application via the (World Wide Web) Internet or corporate Intranet or Extranet and may result in an instant approval application 57 for a merchant services account.

Step 24 of selling to a merchant acquirer a qualified lead may be included in method 10 (see FIG. 1). Step 24 may be for selling to a merchant acquirer a qualified lead and may include any steps in selling to a merchant acquirer a qualified lead. Step 24 may be based on based on the gathered information, the verified credit of the business, and/or the instant approval application. The qualified lead may be generated any time in method 10. For example, step 24 of selling to a merchant acquirer a qualified lead may be generated after step 18 of delivering the set of competitive acquirer rates, after step 22 of verifying the credit of the business, and/or after step 23 of providing the selected merchant acquirer's application to the business (as illustrated in FIG. 1). Step 24 may be accomplished by any means, including, through a prior contract where the merchant acquirer pays for each time their rate is given to a business, each time the business accepts the rate by click through process 54 or by high touch process 56, and/or each time the business submits instant approval application 57.

Figure 2:
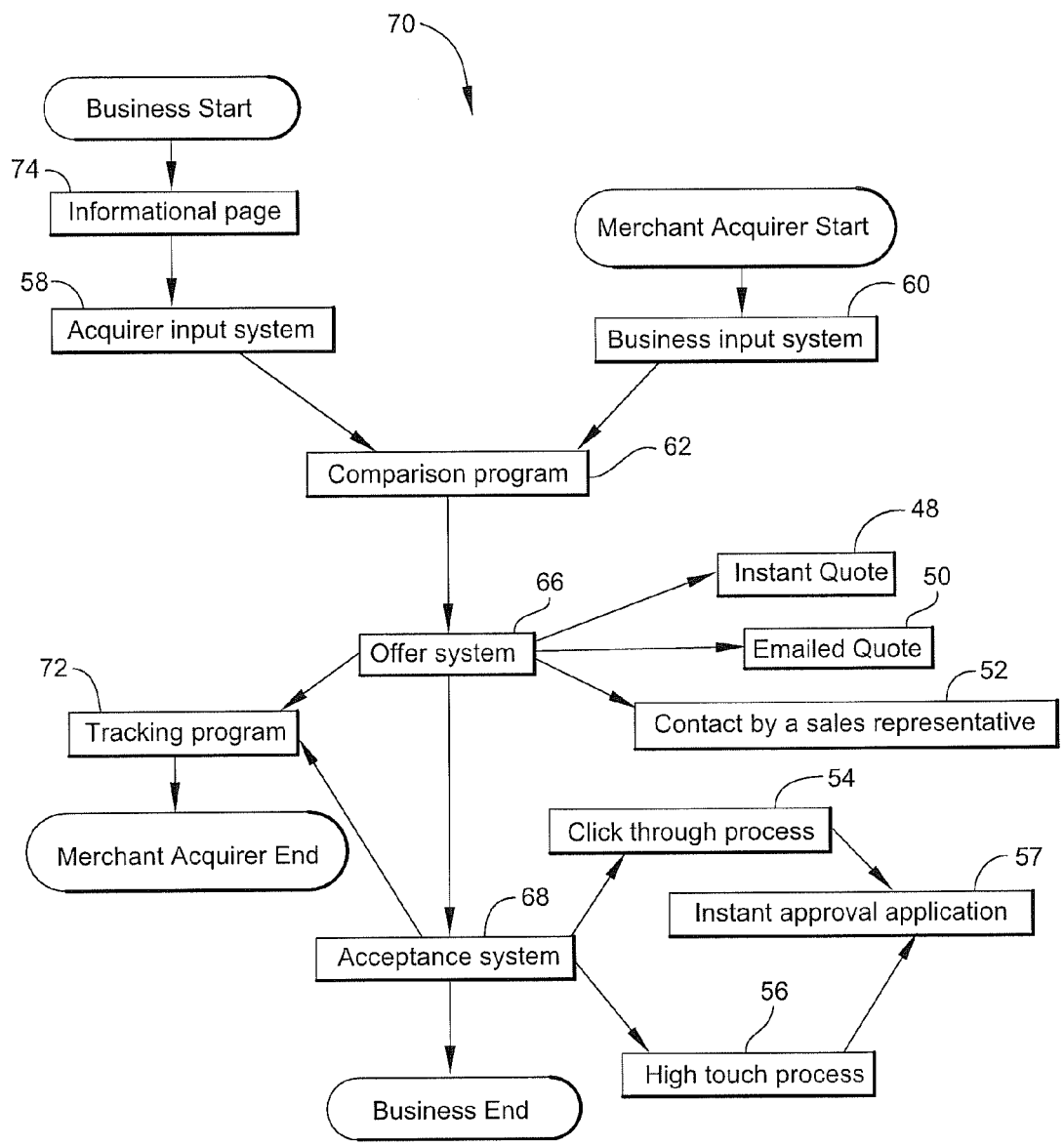
FIG. 2 is a flow chart of one embodiment of the computer network for assisting a business in acquiring merchant services.

Computer network 70 may be used to carry out method 10 (see FIG. 2). Computer network 70 may be any computer network. Computer network 70 may be for providing a forum for method 10 to be easily accessed by the public. Computer network 70 may include an informational page 74, an acquirer input system 58, a business input system 60, a comparison program 62, an offer system 66, an acceptance system 68, and a tracking program 72 (see FIG. 2).

Informational page 74 may be included in computer network 70 (see FIG. 2). Informational page 74 may be for accomplishing step 11 of providing the business with details on acquiring merchant services. Informational page 74 may be any device on computer network 70 for providing the business with the background and details on the process of acquiring merchant services, including, but not limited to, an introductory webpage for computer network 70. Informational page 74 may include, but is not limited to, information on who the merchant acquirers are, interchange, MasterCard® and Visa® dues and assessments, the average merchant rates, the factors that are used to calculate the merchant rates, point of sale terminal options, pricing, usage, merchant service contract information, billing information, and information on various types of credit/debit cards that are accepted and their associated rates.

Acquirer input system 58 may be included in computer network 70 (see FIG. 2). Acquirer input system 58 may be for providing a system for merchant acquirers to input and/or change a set of rates for all possible combinations of gathered information, i.e., all possible combinations of type of business 26, method of presentment 28, volume 30, and ticket 32. Acquirer input system 58 may be any system that may allow merchant acquirers to input and/or change a set of rates for all possible combinations of gathered information, including, but not limited to, a web-based interface. Acquirer input system 58 may only allow authorized merchant acquirers to input a set of rates for all possible combinations of gathered information. Merchant acquirers may be authorized by any means, including, but not limited to, providing a username, password, and/or an answer to a challenge question. Acquirer input system 58 may be a web-based interface where the authorized merchant acquirers may log onto a secure extranet by providing a user id and password, and answer a challenge response question.

Business input system 60 may be included in computer network 70. Business input system 60 may be for providing a system for businesses to input the gathered information, i.e., type of business 26, method of presentment 28, annual sales volume 30 and average ticket 32 and the form of contact the competitive acquirer rate may be delivered by, i.e., instant quote 48, emailed quote 50, or contact by a sales representative 52. Business input system 60 may be for carrying out step 12 of gathering the information of the business and step 16 of requesting the form of contact. Business input system 60 may be any system that allows a business to enter the gathered information and the form of contact, including, but not limited to, the use of an interactive webpage.

Comparison program 62 may be included in computer network 70 (see FIG. 2). Comparison program 62 may be for comparing all the set of rates entered in acquirer input system 58 to the gathered information entered into business input system 60 to calculate at least one competitive acquirer rate. Comparison program 62 may be for carrying out step 14 of comparing the gathered information to the repopulated rate grid. Comparison program 62 may be any program capable of calculating at least one competitive acquirer rate based on all the set of rates entered in acquire input system 58 and the gathered information entered into business system 60, including, but not limited to. For example, comparison program 62 may be an electronic spreadsheet.

Offer system 66 may be included in computer network 70 (see FIG. 2). Offer system 66 may be a system for providing an offer of the at least one competitive acquirer rate to the business. Offer system 66 may be for carrying out step 18 of delivering the competitive acquirer rates to the business by the selected form of contact. Offer system 66 may be any system for providing an offer of the competitive acquirer rates to the business. Offer system 66 may deliver the competitive acquirer rates to the business by any means, including but not limited to, instant quote 48, emailed quote 50, and contact by a sales representative 52.

Acceptance system 68 may be included in computer network 70 (see FIG. 2). Acceptance system 68 may be a system for allowing the business to accept one of the competitive acquirer rates. Acceptance system 68 may be any system for allowing the business to accept one of the competitive acquirer rates. Acceptance system 68 may be for accomplishing step 23 of providing the selected merchant acquirer's application to the business. Acceptance system 68 may allow the business to accept one of the offers by any means, including, but not limited to, click through process 54, where the business may click through to the merchant acquirer's website, or high touch process 56, where the business may be contacted by a sale representative. The business may use the click through process 54 from instant quote 48 or emailed quote 50. The business may use the high touch process 56 from instant quote 48, emailed quote 50, or contact by a sales representative 52. Click through process 56 and/or high touch process 56 may lead the business to completing instant approval application 57.

Tracking program 72 may be included in computer network 70 (see FIG. 2). Tracking program 72 may be for tracking the number of competitive acquirer rates offered to the business through offer system 66 and the number of acquirer rates accepted from acceptance system 68, via click through process 54, high touch process 56 and/or instant approval application 57. Tracking program 72 may be used for carrying out step 24 of selling to a merchant acquirer a qualified lead. Tracking program 72 may be any program for tracking the number of acquirer rates offered to the business through offer system 66 and/or the number of acquirer rates accepted from acceptance system 68, via click through process 54, high touch process 56 and/or instant approval application 57. For example, tracking program 72 may be an electronic counter program.

In operation, computer network 70 may be used to carry out method 10 of assisting a business in acquiring merchant services. All authorized merchant acquirers may populate the repopulated rate grid through acquirer input system 58. Acquirer input system 58 may be a web-based interface where the authorized merchant acquirers may log onto a secure extranet by providing a user id and password, and answering a challenge response question. Upon passing security measures, the merchant acquirer will be given the option to input or make changes to their set of rates. The merchant acquirer will supply rates for all combinations of business type 26, method of presentment 28, annual sales volume 30 and average ticket 32 within each category of POS terminal usage (terminal sale 38, terminal rental 40, terminal lease 42, terminal loaner 44, and terminal software/gateway 46).

Once the merchant acquirers input data into the repopulated rate grid, a business may use computer network 70. The business may read informational page 74 for all the details on acquiring merchant services, like, information on who the merchant acquirers are, interchange, MasterCard® and Visa® dues and assessments, the average merchant rates, the factors that are used to calculate the merchant rates, point of sale terminal options, pricing, usage, merchant service contract information, billing information, and information on various types of credit/debit cards that are accepted and their associated rates.

Once the business is knowledgeable about the details on acquiring merchant services, the business may elect to go forward by entering their business information or the gathered information onto computer network 70. The gathered information may include type of business 26, method of presentment 28, annual sales volume 30, and average ticket 32. The gathered information may also include the personal information of the business owner like the owners' name, the home and business addresses and the home and business phone numbers. The gathered information may be entered onto acquirer input system 58. After the business has entered the gathered information, the business may be prompted to select the form of contact, by choosing either instant quote 48, emailed quote 50, or contact by a sales representative 52.

Once the business has entered the gathered information and selected the form of contact, comparison program 62 may calculate at least one competitive acquirer rate based on the repopulated rate grid. In combination, type of business 26, method of presentment 28, annual sales volume 30, and average ticket 32 may be used in calculating the competitive acquirer rates. The repopulated rate grid may be populated with set of rates 34 from all possible merchant acquirers. The repopulated rate grid may be populated within each merchant acquirer for all POS terminal usage, including, terminal sale 38, terminal rental 40, terminal lease 42, terminal loaner 44, and terminal software/gateway 46. The repopulated rate grid may also be populated with the functionality of the POS terminal (using a dial up or broadband connection) or whether a peripheral such as a pin pad may be purchased, leased, or rented to process (online) pin based debit transactions.

Once comparison program 62 has calculated at least one competitive acquirer rate, offer system 66 may provide the business with the competitive acquirer rates. Offer system 66 may provide the business with the competitive acquirer rates based on what form of contact the business may have selected. Thus, offer system 66 may provide the business with the competitive acquirer rates through instant quote 48 directly on computer network 70, emailed quote 50 via email, or contact by a sales representative 52 via a telephone call.

After offer system 66 may provide the business with the competitive acquirer rates, acceptance system 68 may allow the business to accept one of the competitive acquirer rates. If the form of contact was instant quote 48 or emailed quote 50, acceptance system 68 may allow the business to elect to use click through process 54 to connect to the merchant acquirer's website to accept the selected competitive acquirer rate. This may include step 23 where the business is provided with the selected acquirer's application. The selected acquirer's application may be an online merchant application via the (World Wide Web) Internet, or corporate Intranet or Extranet, that may be completed by the business and result in instant approval application 57 for a merchant service account. If the form of contact was instant quote 48, emailed quote 50, or contact by a sales representative 52, acceptance system 68 may allow the business to accept the selected competitive acquirer rate by high touch process 56, where the rate may be accepted over the telephone through contact by a sales representative 52. This process may also include step 23 where the selected acquirer's application is provided to the business over the telephone.

During the process of offering the competitive acquirer rates to the business and the business accepting the rates, tracking program 72 may keep track of the number of offers and acceptances for each merchant acquirer. These numbers may be used in step 24 of selling to a merchant acquirer a qualified lead.

The present invention may be embodied in other forms without departing from the spirit and the essential attributes thereof, and, accordingly, reference should be made to the appended claims, rather than to the foregoing specification, as indicated in the scope of the invention.

We claim:

1. A method of assisting a business with acquiring merchant services comprising the steps of:
   gathering the information of said business on a computer network;
   comparing said gathered information to a repopulated rate grid on said computer network;
   said repopulated rate grid being a set of rates given by a group of merchant acquirers for all possible combinations of said gathered information; and
   providing said business with at least one competitive acquirer rate on said computer network;
   said at least one competitive acquirer rate assisting a business with acquiring merchant services.

2. The method of claim 1 where said gathered information including:
   a type of business;
   a method of presentment;
   an annual sales volume; and
   an average ticket.

3. The method of claim 2 where said type of business being selected from the group consisting of: retail, restaurant, retail service with tips, professional, internet/ecommerce, lodging, trade services, and mail/phone order.

4. The method of claim 2 where said method of presentment being either card present or card not present.

5. The method of claim 2 where said average ticket being the average sale per customer of said business.

6. The method of claim 1 where said set of rates being given for all POS terminal usage.

7. The method of claim 6 where said POS terminal usage includes a terminal sale, a terminal rental, a terminal lease, a terminal loaner, and a terminal software/gateway.

8. The method of claim 1 where said step of providing said business with at least one competitive acquirer rate comprises the steps of:
   requesting a form of contact for said competitive acquirer rates to be delivered to said business on said computer network; and
   delivering said competitive acquirer rates to said business by said form of contact on said computer network.

9. The method of claim 8 where said form of contact being selected from the group consisting of: instant quote, emailed quote, and contact by a sales representative.

10. The method of claim 1 further comprising the steps of:
    presenting the details on acquiring merchant services on said computer network;
    verifying said gathered information on said computer network;
    verifying the credit of said business on said computer network;
    providing a selected merchant acquirer's application to the business on said computer network; and
    selling to a merchant acquirer a qualified lead on said computer network.

11. The method of claim 10 where said step of providing a selected merchant acquirer's application to the business on said computer network results in an instant approval application.

12. The method of claim 1 being conducted through a computer network.

13. A computer network for assisting a business in acquiring merchant services comprising:
    an informational page with the details on acquiring merchant services;
    an acquirer input system for allowing a group of merchant acquirers to input a set of rates;
    a business input system for allowing said business to enter gathered information;
    a comparison program for comparing said gathered information to a repopulated rate grid and providing at least two competitive rates to said business;
    an offer system for providing an instant offer of at least one competitive acquirer rate;
    an acceptance system for allowing said business to accept one of said competitive acquirer rates; and
    a tracking system for tracking said offer system and said acceptance system;
    said at least one competitive acquirer rate assisting a business with acquiring merchant services.

14. The computer network of claim 13 where said acceptance system allows the business to click through to the merchant acquirer's website or high touch by having the merchant acquirer call the business.

15. The computer network of claim 14 resulting in an instant approval application.

16. A method of assisting a business with acquiring merchant services comprising the steps of:
    presenting details on acquiring merchant services on a computer network;
    gathering the information of said business on said computer network;
    said gathered information including:
      a type of business;
      a method of presentment;
      a volume;
      a ticket and
      said type of business being selected from the group consisting of: retail, restaurant, retail service with tips, professional, internet/ecommerce, lodging, trade services, and mail/phone order;
    said method of presentment being either a card present method or a card not present method;
    comparing said gathered information to a repopulated rate grid on said computer network;
    said repopulated rate grid being a set of rates given by a group of merchant acquirers for all possible combinations of said gathered information;
    said set of rates being given for all POS terminal usage;
    said POS terminal usage includes a terminal sale, a terminal rental, a terminal lease, a terminal loaner, and a terminal software/gateway;
    requesting a form of contact for at least one competitive acquirer rate to be delivered to said business on said computer network;
    said form of contact being selected from the group consisting of: instant quote, emailed quote, and contact by a sales representative;
    delivering said competitive acquirer rates to said business by said form of contact on said computer network;
    verifying said gathered information on said computer network;
    verifying the credit of said business on said computer network;
    providing a selected merchant acquirer's application to the business on said computer network; and
    selling to a merchant acquirer a qualified lead on said computer network;
    said at least one competitive acquirer rate assisting a business with acquiring merchant services.

17. The method of claim 16 being conducted through a computer network.

18. The method of claim 17 where said computer network comprising:

an informational page for presenting details on acquiring merchant services;

an acquirer input system for allowing said group of merchant acquirers to input said set of rates;

a business input system for allowing said business to enter said gathered information;

a comparison program for comparing said gathered information to said repopulated rate grid and providing at least two competitive rates to said business;

an offer system for providing an instant offer of at least one competitive acquirer rate;

an acceptance system for allowing said business to accept one of said competitive rates; and a tracking program for tracking said offer system and said acceptance system.

19. The method of claim 18 where said acceptance system allows the business to click through to the merchant acquirer's website or high touch by having the merchant acquirer call the business resulting in an instant approval application.

* * * * *